(12) United States Patent
Sudbrink et al.

(10) Patent No.: US 10,548,253 B2
(45) Date of Patent: Feb. 4, 2020

(54) AGRICULTURAL IMPLEMENT WITH TURNBUCKLE LATCHING MECHANISM

(71) Applicant: CNH Industrial Amercia LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 640 days.

(21) Appl. No.: 15/148,388

(22) Filed: May 6, 2016

(65) Prior Publication Data
US 2017/0318729 A1    Nov. 9, 2017

(51) Int. Cl.
| | | |
|---|---|---|
| A01B 59/00 | (2006.01) | |
| A01B 59/042 | (2006.01) | |
| A01B 49/02 | (2006.01) | |
| F16B 7/06 | (2006.01) | |
| F16B 7/22 | (2006.01) | |

(52) U.S. Cl.
CPC .......... *A01B 59/004* (2013.01); *A01B 49/02* (2013.01); *A01B 59/042* (2013.01); *F16B 7/06* (2013.01); *F16B 7/22* (2013.01)

(58) Field of Classification Search
CPC ................... A01B 59/004; F16B 7/06
See application file for complete search history.

(56) References Cited

U.S. PATENT DOCUMENTS

| | | | |
|---|---|---|---|
| 2,843,408 A | | 7/1958 | Stukenborg |
| 2,878,043 A | * | 3/1959 | Edman et al. ........ A01B 59/004 403/46 |
| 2,878,044 A | | 3/1959 | Estes |
| 3,081,116 A | | 3/1963 | Weiner et al. |
| 3,803,926 A | | 4/1974 | Winter |
| 3,825,283 A | * | 7/1974 | Hansen ................ A01B 59/004 172/439 |
| 4,194,757 A | * | 3/1980 | Lucas et al. ......... A01B 59/004 172/439 |
| 4,778,194 A | * | 10/1988 | Koch et al. .......... A01B 59/004 172/448 |
| 5,156,482 A | | 10/1992 | Owings |
| 6,056,069 A | | 5/2000 | Hagen et al. |
| 6,609,575 B1 | | 8/2003 | Crabb |
| 7,048,071 B1 | * | 5/2006 | Huenink et al. ..... A01B 59/004 172/439 |
| 8,851,199 B2 | | 10/2014 | Sauermann |
| 9,155,238 B2 | | 10/2015 | Sauermann |
| 9,179,590 B2 | | 11/2015 | Heitlinger et al. |

(Continued)

FOREIGN PATENT DOCUMENTS

GB         601981        5/1948

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

An agricultural implement includes a chassis; a linkage carried by the chassis; a turnbuckle connected to the linkage and having a frame which includes a threaded hole formed therein and a non-circular region; and a latch pivotable about a fulcrum carried above the frame. The latch has a notch formed therein which is shaped to prevent substantial rotation of the frame when engaged with the non-circular region of the frame.

13 Claims, 4 Drawing Sheets

(56) References Cited

U.S. PATENT DOCUMENTS 9,221,313 B2 12/2015 Heitlinger et al.
2006/0127166 A1 6/2006 Huenink et al.
2015/0129259 A1 5/2015 Sudbrink et al.

* cited by examiner

AGRICULTURAL IMPLEMENT WITH TURNBUCKLE LATCHING MECHANISM

BACKGROUND OF THE INVENTION

1. Field of the Invention

The present invention relates to agricultural implements, and, more particularly, to tillage implements.

2. Description of the Related Art

Turnbuckles can be used in agricultural implements to adjust lift wheels for a variety of conditions. As is known, a turnbuckle usually consists of a frame with a pair of threaded openings and threaded pins threaded into the threaded openings. One of the threaded openings and associated threaded pins have a left-hand thread and the other threaded opening and associated threaded pin have a right-hand thread, so rotation of the frame causes both of the threaded pins to advance into their respective threaded openings or both threaded pins to advance out of their respective threaded openings. The tension between elements connected to the turnbuckle by the threaded pins can thus be adjusted by rotating the frame. In the case of a tillage implement, adjusting the tension between the elements can adjust the fore-to-aft leveling of the implement.

During operation of the implement, the frame of the turnbuckle can turn when it is loaded if the frame is not locked into position and cause unwanted changes to the fore-to-aft leveling and soil penetration depth of the shanks. A common locking device is a jam nut that is tightened onto the face of the frame by rotating the jam nut on threads of the threaded pins, with the friction from the jam nut on the face preventing rotation of the frame and undesired adjustment of the soil penetration depth. On larger turnbuckles which require greater locking forces, this requires a large jam nut which must be engaged by a correspondingly large wrench, which a user must carry in order to adjust the turnbuckle. If the user forgets or loses the wrench, the turnbuckle cannot be easily unlocked for adjustment or preparing the implement for high-speed travel. Alternatively, the implement can have the large wrench as a built-in element, but this increases the complexity of the implement.

What is needed in the art is a more convenient way to lock the turnbuckle of an agricultural implement.

SUMMARY OF THE INVENTION

The present invention provides an agricultural implement with a latch that pivots about a fulcrum carried above a turnbuckle frame and has a notch formed therein which prevents substantial rotation of the frame when engaged with a non-circular region of the frame.

The invention in one form is directed to an agricultural implement including a chassis; a linkage carried by the chassis; a turnbuckle connected to the linkage and having a frame which includes a threaded hole formed therein and a non-circular region; and a latch pivotable about a fulcrum carried above the frame, the latch having a notch formed therein which is shaped to prevent substantial rotation of the frame when engaged with the non-circular region of the frame.

The invention in another form is directed to a turnbuckle assembly including a frame having a threaded hole and a non-circular region; a threaded pin threaded into the threaded hole; and a latch pivotable about a fulcrum which is held above the frame, the latch having a notch formed therein which is shaped to prevent substantial rotation of the frame when engaged with the non-circular region of said frame.

An advantage of the present invention is the notch of the latch can be pivoted into engagement with the non-circular region of the frame to conveniently prevent substantial rotation of the frame.

Another advantage is the notch of the latch can be pivoted out of engagement with the non-circular region of the frame to conveniently allow adjustment of the turnbuckle.

Yet another advantage is the latch does not add a substantial amount of weight or complexity to the implement.

Yet another advantage is the location of the center of gravity of the latch can be adjusted so the notch of the latch can engage the non-circular region of the turnbuckle frame when the turnbuckle moves vertically.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
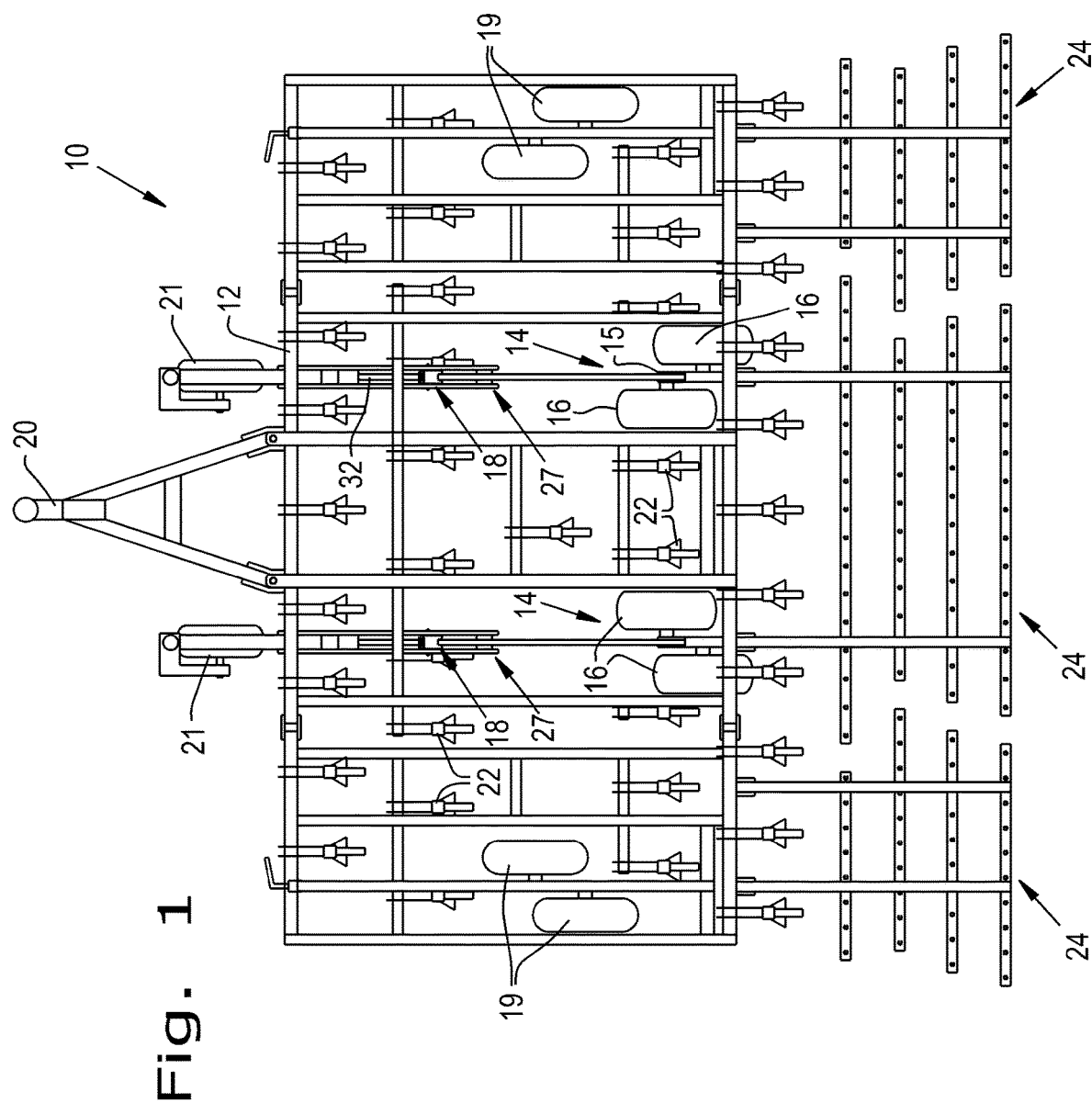
FIG. 1 is a top view of an embodiment of an agricultural implement formed according to the present invention.

Referring now to the drawings, and more particularly to FIG. 1, there is shown an embodiment of an agricultural implement 10, shown as a cultivator, formed according to the present invention which generally includes a chassis 12 and lift wheel assemblies 14. The lift wheel assemblies 14, which include a lift arm 15 connected to one or more lift wheels 16, are pivotably connected to a pivoting tube 17 such that changing the amount of tension applied to the lift arm 15 causes the lift arm 15 to pivot about the pivoting tube 17 and change the angular position of the lift wheels 16, relative to the pivoting tube 17, as is known. The cultivator 10 can also include multiple gauge wheels 19 that may have a smaller width and/or diameter than the lift wheels 16. A hitch 20 is connected to a front of the chassis 12 to allow the cultivator 10 to be connected to and carried by a powered vehicle, such as a tractor which is not shown. Once the hitch 20 is connected to the tractor, the cultivator 10 can be towed across a field to allow multiple shanks 22 carried by the chassis 12 to dig into the field soil and prepare the field for seed planting. When the lift wheels 16 and gauge wheels 19 both contact the ground, the wheels 16, 19 work in conjunction to control the soil penetration depth of the shanks 22. The shanks 22 can be followed by harrows 24 that will evenly distribute soil and residue disrupted by the shanks 22 to provide a smooth, level finish of soil. Alternatively, the harrows 24 can be replaced by different elements that finish the soil, such as packing wheels. It should thus be appreciated that many different configurations of shanks 22 and harrows 24 or other elements can be utilized according to the present invention, and the illustrated configuration only shows one such possible configuration.

Figure 2:
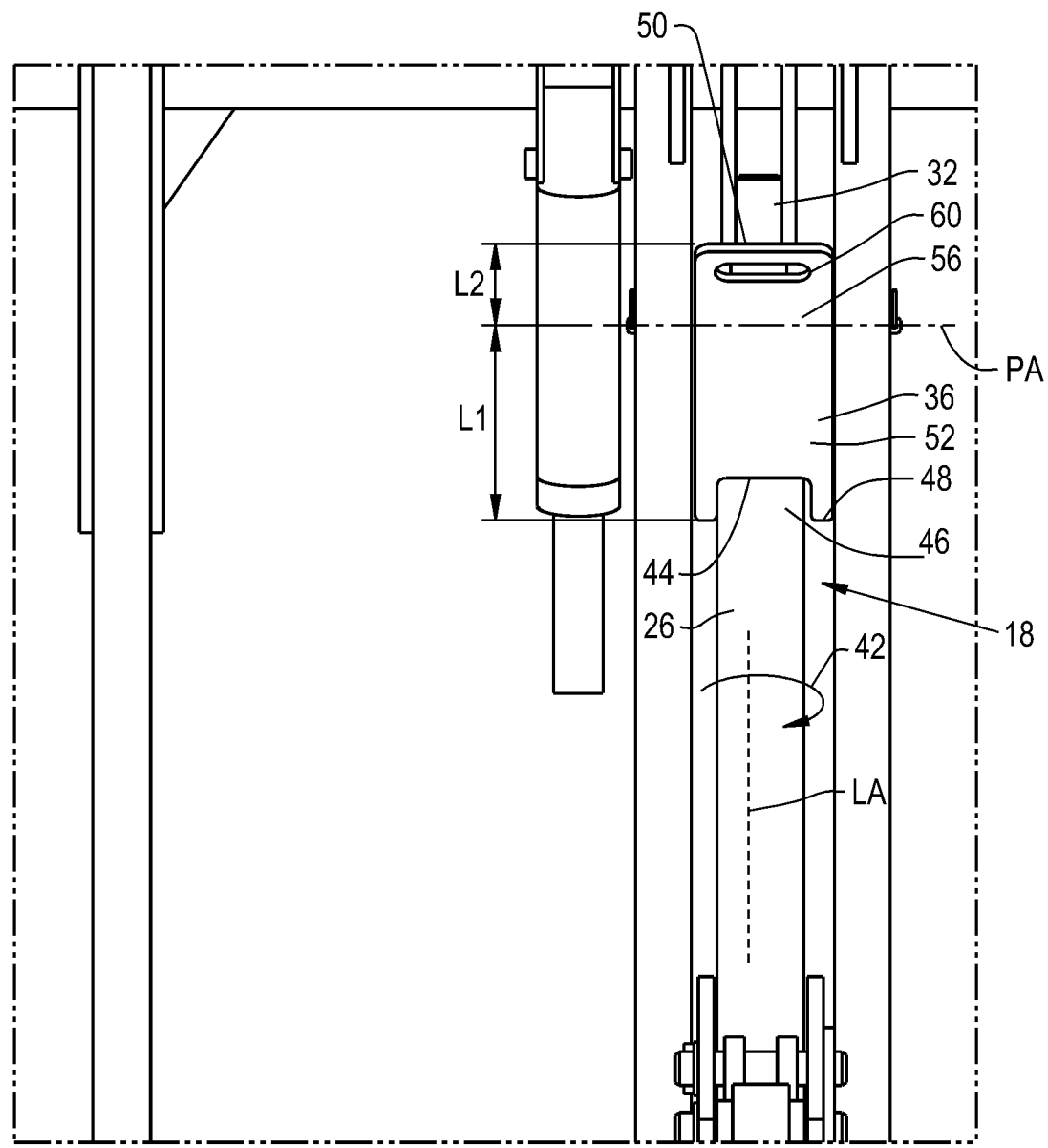
FIG. 2 is a top view of a portion of the agricultural implement shown in FIG. 1 better showing an embodiment of a turnbuckle assembly formed according to the present invention.
Figure 5:
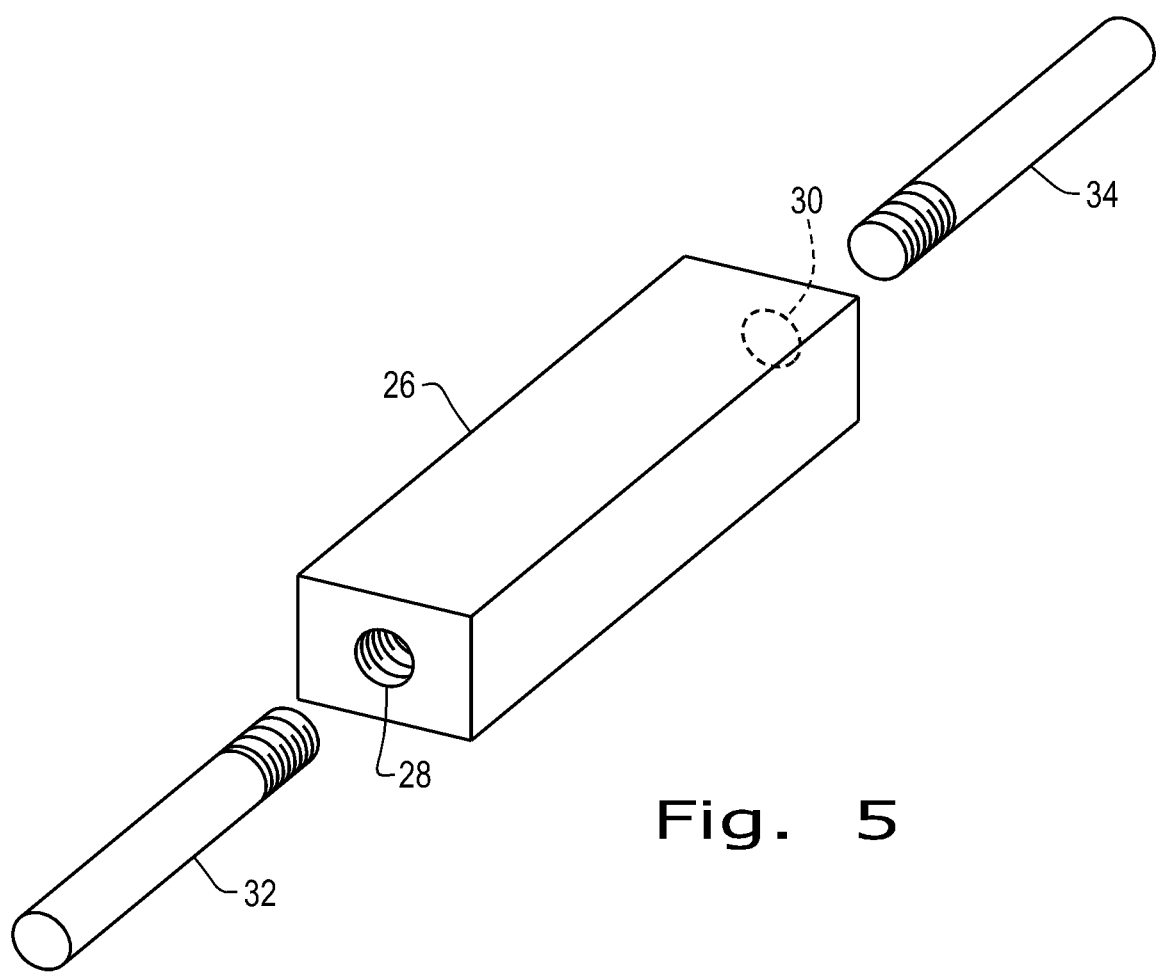
FIG. 5 is an exploded view of the turnbuckle assembly shown in FIGS. 1-4.

Referring now to FIGS. 1-2 and 5, it can be seen that each turnbuckle 18, which can also be referred to as turnbuckle assemblies, includes a frame 26 with two threaded holes 28 and 30 (shown in FIG. 5), with the threaded hole 28 having a first threaded pin 32 threaded therein which is connected to a parallel arm of the chassis 12 to connect to, for example, a caster wheel 21 and the threaded hole 30 having a second threaded pin 34 threaded therein which is connected to a rocker linkage 27 which is also connected to the lift arm 15. An example of such a configuration that can be included in an agricultural implement of the present invention is described in U.S. Patent Application Publication No. 2015/0129259, which is incorporated in its entirety herein by reference. It should be appreciated that the turnbuckle 18 of the present invention can be connected to many different types of linkages, or elements of a vehicle other than a linkage. The threaded hole 28 and its respective threaded pin 32 can have a right-handed thread while the threaded hole 30 and its respective threaded pin 34 can have a left-handed thread, allowing rotation of the frame 26 to cause both pins 32 and 34 to have fewer threads engaged with their respective hole 28, 30 or both pins 32 and 34 to have more threads engaged with their respective hole 28, 30. For example, rotation of the frame 26 can cause more threads of the pins 32, 34 to engage the threaded holes 28, 30 or the frame 26 can be rotated in the opposite direction so fewer threads of the pins 32, 34 engage the threaded holes 28, 30. Since fewer or more threads of the pins 32, 34 engage the threaded holes 28, 30 of the turnbuckle 18, the fore-to-aft levelling of the implement 10 can be adjusted by rotating the frame 26 of the turnbuckle 18.

Figure 3:
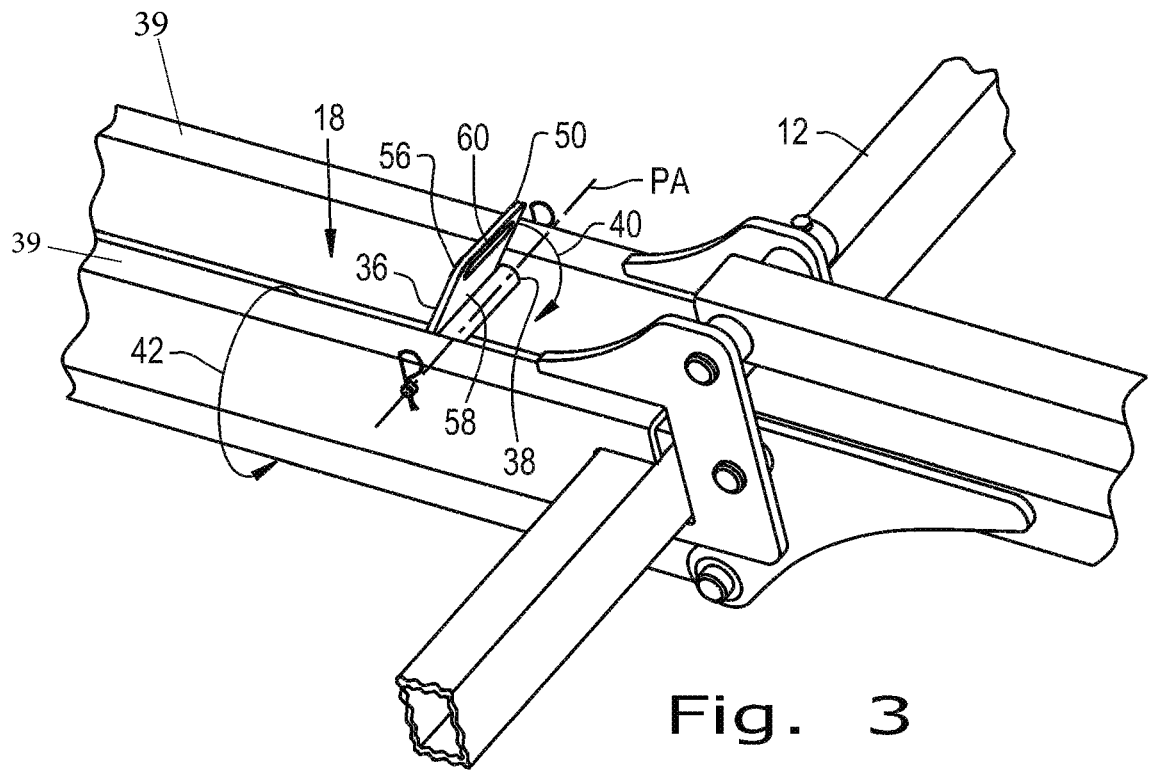
FIG. 3 is a perspective view of the turnbuckle assembly shown in FIGS. 1-2.

Referring specifically now to FIGS. 2 and 3, it can be seen that the cultivator 10 includes a latch 36 which is pivotable about a fulcrum 38, shown as a pivot pin connected to the latch 36, which is carried above the frame 26 of the turnbuckle 18 and pivotably coupled between a pair of parallel chassis portions 39. The fulcrum 38 can define a pivoting axis PA which is transverse to a longitudinal axis LA defined by the frame 26 of the turnbuckle 18, so a rotational direction of the latch 36, indicated by arrow 40, is perpendicular to a rotational direction of the frame 26 of the turnbuckle 18, which is indicated by arrow 42. By arranging the latch 36 and fulcrum 38 in this manner, the latch 36 can be pivoted about the pivoting axis PA toward and away from the frame 26 of the turnbuckle 18 so a notch 44 formed in the latch 36 can engage a non-circular region 46 of the frame 26 and prevent substantial rotation of the frame 26. As used herein, a "non-circular region" of the frame 26 refers to at least a portion of the frame 26 which has a cross-section that does not have a constantly defined radius about a middle, i.e., is not circular. In this sense, while the non-circular region 46 is shown as the entirety of the frame 26 with a rectangular cross-section, the non-circular region can be only a portion of the frame 26 and have other cross-sectional shapes such as triangular, hexagonal, octagonal, oval, etc. which allows the notch 44 of the latch 36 to engage the region 46 and prevent the frame 26 of the turnbuckle 18 from rotating more than 10-35 degrees about the longitudinal axis LA. The notch 44 preventing substantial rotation of the frame 26 therefore prevents substantial linear movement of the pins 32, 34 in their respective threaded hole 28, 30 to maintain the fore-to-aft levelling of the implement 10. Thus, the latch 36 pivoting about the fulcrum 38 should be rotationally independent of the frame 26 of the turnbuckle 18 rotating, so rotation of the frame 26 does not cause significant, similar rotation of the latch 36 and/or fulcrum 38, or vice versa.

As shown in FIG. 2, the notch 44 can have a rectangular shape which is similar to the rectangular region 46 of the frame 26, with the notch 44 being slightly wider in comparison to the rectangular region 46 of the frame 26 to allow the latch 36 to easily pivot away from the frame 26 when the user wishes to rotate the frame 26 and adjust the turnbuckle 18. Once the notch 44 engages the rectangular region 46, rotation of the frame 26 is constrained due to the geometry of the notch 44 interfering with the rotation of the rectangular region 46 about the longitudinal axis LA. It should therefore be appreciated that engagement of the notch 44 with the non-circular region 46 does not have to occur as soon as the latch 36 achieves a naturally resting position, which will be described further herein, but can occur when the frame 26 rotates due to a load being applied to the turnbuckle 18. It should be further appreciated that the shape of the notch 44 does not have to match the shape of the non-circular region 46, so long as the geometry of the notch 44 can engage the non-circular region 46 of the frame 26 to prevent substantial rotation of the frame 26 about the longitudinal axis LA.

During use of the implement 10, the rocker linkage 27, which can be pivotably connected to the turnbuckle 18, can move vertically to adjust the lift wheels 16. To vertically adjust the lift wheels 16, the rocker linkage 27 can be connected to a cylinder or other actuator (not shown) which will extend and retract to cause the linkage 27 to move and cause a corresponding raising or lowering of the lift arm 15 and lift wheels 16. As the turnbuckle 18 is linked to the rocker linkage 27, this movement will also cause the turnbuckle 18 to vertically move. Since the latch 36 is pivotable about the fulcrum 38, which is above the frame 26 of the turnbuckle 18, controlling the location of the center of gravity of the latch 36, which is affected by the mass distribution of the latch 36, can assist in keeping the latch 36 in position so the notch 44 stays engaged with the non-circular region 46 of the frame 26 even when the turnbuckle 18 moves vertically with the rocker linkage 27. Similarly, there may be instances when a user will want to disengage the notch 44 from the non-circular region 46 of the frame 26 in order to rotate the frame 26 and adjust the angular position of the lift arm 15 and lift wheels 16 relative to the pivoting tube 17. To allow this, the latch 36 can have the notch 44 formed in a first longitudinal end 48 of the latch 36 while an opposite longitudinal end 50 of the latch 36 is un-notched, i.e., cannot engage the non-circular region 46 to prevent rotation of the frame 26. This allows the latch 36 to have two positions: a locking position where the notch 44 is placed adjacent to the non-circular region 46 to engage the non-circular region 46 and prevent substantial rotation; and a rotating position where the un-notched longitudinal end 50 is adjacent to the non-circular region 46 and the notch 44 cannot engage the non-circular region 46 to prevent rotation of the frame 26.

The latch 36 and fulcrum 38 can be arranged so a first region 52 of the latch 36, defined on a first side 54 of the fulcrum 38, includes the notched longitudinal end 48 and the un-notched longitudinal end 50 is included in a second region 56 of the latch 36 which is on a second side 58 of the fulcrum 38 opposite the first side 54. As the user will generally want the latch 36 biased toward the locking position when the implement 10 is traveling, the first region 52 of the latch 36 can have a greater mass than the second region 56 of the latch 36, so the center of gravity of the latch 36 is located in the first region 52 below the fulcrum 38 and biases the latch 36 toward locking engagement with the non-circular region 46 regardless of the relative vertical position of the frame 26 of the turnbuckle 18. By placing the center of gravity in the first region 52 of the latch 36 below the fulcrum 38, the notch 44 tends to stay tipped toward the non-circular region 46 even if the relative vertical spacing between the fulcrum 38 and the non-circular region 46 changes, such as when the turnbuckle 18 is moved by the rocker linkage 27, allowing the latch 36 to keep the turnbuckle 18 locked if the relative vertical position of the frame 26 changes. While forming the notch 44 in the first region 52 of the latch 36 requires removing material of the latch 36, making the first region 52 of the latch 36 have a greater mass than the second region 56 of the latch 36 is relatively simple and can be accomplished in a variety of ways. For example, a length L1 of the first region 52 can be greater than a length L2 of the second region 56, assuming the thickness and density of the material forming the two regions is similar. Further, a mass-reducing cutout 60 can be formed in the second region 56 to reduce the mass of material of the second region 56. It should be appreciated that such ways to make the mass of the first region 52 greater than the second region 56 are exemplary only and many other techniques can be utilized, such as adjusting the material density and/or thickness of the first region 52 compared to the second region 56.

Figure 4:
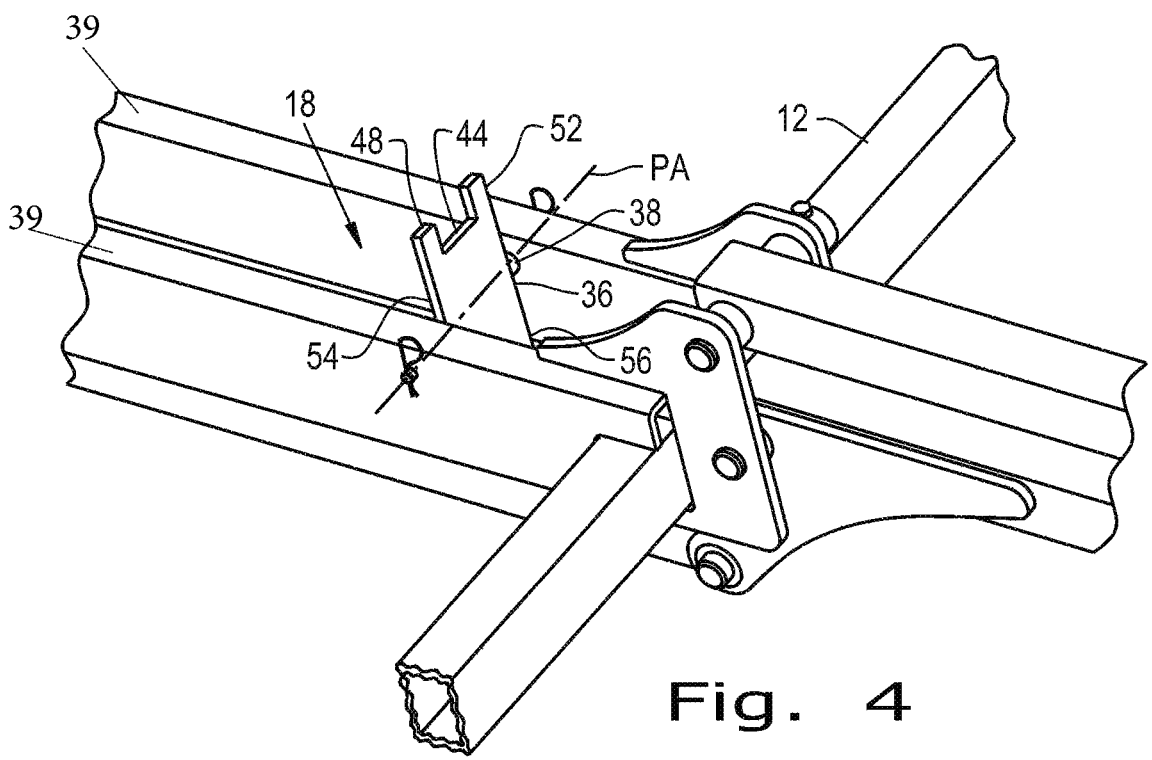
FIG. 4 is a perspective view of the turnbuckle assembly shown in FIGS. 1-3 in a rotating position.

To flip the latch 36 from the locking position, shown in FIGS. 2-3, to the rotating position, shown in FIG. 4, a user can simply push on the second region 56 of the latch 36 to pivot the latch 36 about the pivoting axis PA defined by the fulcrum 38 until the un-notched longitudinal end 50 is adjacent the frame 26 and the notch 44 cannot engage the non-circular region 46. Once the notch 44 cannot engage the non-circular region 46, the user can rotate the frame 26 of the turnbuckle 18 to adjust the angular position of the lift arm 15 and lift wheels 16. After adjusting the angular position of the lift arm 15 and lift wheels 16 to a desired angle relative to the pivoting tube 17, the user can then flip the latch 36 back into the locking position so the notch 44 can engage the non-circular region 46 and prevent substantial rotation of the frame 26 of the turnbuckle 18. The latch 36, therefore, provides a simple and efficient mechanism that can be built into the cultivator 10 to lock and unlock rotation of the turnbuckle 18 to adjust and maintain the angular position of the lift arm 15 and lift wheels 16 relative to the pivoting tube 17.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement, comprising:
   a chassis;
   a linkage carried by the chassis;
   a turnbuckle connected to the linkage, the turnbuckle having a frame which includes at least one threaded hole formed therein and at least one threaded pin threaded into the at least one threaded hole, the frame including a non-circular region, the frame positioned between a pair of chassis portions positioned on each lateral side of the frame; and
   a latch pivotable about a fulcrum that is carried above the frame, the fulcrum connected to the chassis portions and extending transversely therebetween above the frame, the latch having a notch formed therein, the notch being shaped to prevent substantial rotation of the frame when engaged with the non-circular region of the frame,
   wherein the latch is pivotable about the fulcrum between an unlocked position where the notch is out of engagement with the non-circular region of the frame, and a locking position where the notch is engaged with the non-circular region of the frame,
   wherein the latch includes a first region on a first side of the fulcrum and a second region on a second side of the fulcrum opposite the first side, the notch being formed in the first region of the latch, and
   wherein at least one of a mass and a length of the first region of the latch is greater than a at least one of a mass and a length of the second region of the latch so that the first region remains biased in the locking position.

2. The agricultural implement according to claim 1, wherein the turnbuckle defines a longitudinal axis and the fulcrum defines a pivoting axis which is transverse relative to the longitudinal axis.

3. The agricultural implement according to claim 1, wherein the notch is formed in a longitudinal end of the latch.

4. The agricultural implement according to claim 3, wherein the latch has an un-notched longitudinal end opposite the longitudinal end with the notch.

5. The agricultural implement according to claim 1, wherein the chassis portions are positioned parallel relative to the frame.

6. The agricultural implement according to claim 5, wherein the fulcrum is connected to the latch.

7. The agricultural implement according to claim 1, wherein the fulcrum is a pivot pin.

8. An agricultural implement, comprising:
   a chassis;
   a linkage carried by the chassis;
   a turnbuckle connected to the linkage, the turnbuckle including
      a frame having a first threaded hole and a second threaded hole, and a non-circular region;
      a first threaded pin threaded into the first threaded hole and a second threaded pin threaded into the second threaded hole;
      the frame positioned between a pair of parallel chassis portions which are positioned next to each lateral side of the frame;
   a latch pivotable about a fulcrum that is carried above the frame, the fulcrum pivotably connected to the parallel chassis portions and extending transversely therebetween above the frame, the latch having a notch formed in the latch to prevent substantial rotation of the frame when the latch is engaged with the non-circular region of the frame, wherein the latch is connected to the fulcrum and the latch is pivotable about the fulcrum between an unlocked position where the notch is out of engagement with the non-circular region of the frame, and a locking position where the notch is engaged with the non-circular region of the frame, wherein the latch includes a first region on a first side of the fulcrum and a second region on a second side of the fulcrum opposite the first side, the notch being formed in the first region of the latch, and wherein at least one of a mass and a length of the first region of the latch is greater than at least one of a mass and a length of the second region of the latch so that the first region remains biased toward the locking position.

9. The agricultural implement according to claim 8, wherein the turnbuckle defines a longitudinal axis and the fulcrum defines a pivoting axis which is transverse to the longitudinal axis.

10. The agricultural implement according to claim 8, wherein the notch is formed in a longitudinal end of the latch.

11. The agricultural implement according to claim 10, wherein the latch has an un-notched longitudinal end opposite the longitudinal end with the notch.

12. The agricultural implement according to claim 8, wherein the chassis portions are positioned parallel relative to the frame.

13. The agricultural implement according to claim 8, wherein the fulcrum is a pivot pin.

* * * * *